US012117024B2

(12) United States Patent
Tucker et al.

(10) Patent No.: US 12,117,024 B2
(45) Date of Patent: Oct. 15, 2024

(54) PILOT OPERATED BLOW-OFF VALVES FOR HYDRAULIC ACTUATORS

(71) Applicant: ClearMotion, Inc., Billerica, MA (US)

(72) Inventors: Clive Tucker, Charlestown, MA (US); Joseph Thomas Belter, Somerville, MA (US)

(73) Assignee: ClearMotion, Inc., Billerica, MA (US)

(*) Notice: Subject to any disclaimer, the term of this patent is extended or adjusted under 35 U.S.C. 154(b) by 647 days.

(21) Appl. No.: 16/500,667

(22) PCT Filed: May 31, 2018

(86) PCT No.: PCT/US2018/035314
§ 371 (c)(1),
(2) Date: Oct. 3, 2019

(87) PCT Pub. No.: WO2018/222821
PCT Pub. Date: Dec. 6, 2018

(65) Prior Publication Data
US 2020/0049266 A1    Feb. 13, 2020

Related U.S. Application Data

(60) Provisional application No. 62/513,375, filed on May 31, 2017.

(51) Int. Cl.
*F15B 13/02*    (2006.01)
*B60G 17/044*   (2006.01)
*F15B 7/00*     (2006.01)

(52) U.S. Cl.
CPC .......... *F15B 13/027* (2013.01); *B60G 17/044* (2013.01); *F15B 7/006* (2013.01);
(Continued)

(58) Field of Classification Search
CPC ...... F15B 13/027; F15B 13/021; F15B 7/006; F15B 2211/20561; F15B 2211/27;
(Continued)

(56) References Cited

U.S. PATENT DOCUMENTS 5,996,465 A * 12/1999 Morikawa ............... E02F 3/965
                                                     91/458
7,395,907 B2    7/2008 Kock et al.
(Continued)

FOREIGN PATENT DOCUMENTS

DE    102010023434 A1    12/2011
DE    102016216544 A1    3/2018
(Continued)

OTHER PUBLICATIONS

PCT/US2018/35314, Oct. 30, 2018, International Search Report and Written Opinion.
(Continued)

*Primary Examiner* — Dustin T Nguyen
(74) *Attorney, Agent, or Firm* — Wolf, Greenfield & Sacks, P.C.

(57) ABSTRACT

Disclosed herein are various embodiments of a hydraulic actuator that includes one or more check valves having a dynamically varying cracking pressure. In certain embodiments, a hydraulic actuator may be configured to vary the cracking pressure of a check valve based on an operating condition of a pump of the hydraulic actuator. The check valve may be located along a bypass path in the hydraulic actuator, thereby allowing for fluid flow to bypass a pump of the hydraulic actuator by passing through the check valve. The use of such hydraulic actuators is contemplated in, for example, an active suspension system of a vehicle. Additionally, various embodiments of suitable check valves are
(Continued)

disclosed. Additionally, methods are disclosed for operation of the check valve and the hydraulic actuator.

18 Claims, 6 Drawing Sheets

(52) U.S. Cl.
CPC . *F15B 2211/20561* (2013.01); *F15B 2211/27* (2013.01); *F15B 2211/3051* (2013.01); *F15B 2211/3058* (2013.01); *F15B 2211/50527* (2013.01); *F15B 2211/625* (2013.01); *F15B 2211/7053* (2013.01)

(58) Field of Classification Search
CPC ...... F15B 2211/3051; F15B 2211/3058; F15B 2211/50527; F15B 2211/625; F15B 2211/7053; B60G 17/044
See application file for complete search history.

(56) References Cited

U.S. PATENT DOCUMENTS

| | | | |
|---|---|---|---|
| 8,701,400 B2* | 4/2014 | Kondo | F15B 7/006 |
| | | | 60/431 |
| 10,859,100 B2* | 12/2020 | Schaber | F15B 11/022 |
| 2005/0200195 A1* | 9/2005 | Yogo | F15B 21/082 |
| | | | 303/113.1 |
| 2009/0260935 A1 | 10/2009 | Avadhany et al. | |
| 2010/0072760 A1 | 3/2010 | Anderson et al. | |
| 2010/0262308 A1 | 10/2010 | Anderson et al. | |
| 2013/0147205 A1 | 6/2013 | Tucker et al. | |
| 2014/0265168 A1 | 9/2014 | Giovanardi et al. | |
| 2014/0294625 A1 | 10/2014 | Tucker et al. | |
| 2015/0082784 A1 | 3/2015 | Uenishi et al. | |
| 2016/0265559 A1* | 9/2016 | Peterson | F15B 7/006 |
| 2018/0266447 A1* | 9/2018 | Imam | F15B 7/10 |
| 2020/0088214 A1 | 3/2020 | Woodard et al. | |
| 2022/0185056 A1* | 6/2022 | Belter | F16F 9/512 |

FOREIGN PATENT DOCUMENTS

| | | |
|---|---|---|
| EP | 2975273 A1 | 1/2016 |
| JP | 2002-031101 A | 1/2002 |
| JP | 2001-073955 A | 3/2011 |
| WO | WO 2011/154026 A1 | 12/2011 |
| WO | WO 2011/159874 A2 | 12/2011 |
| WO | WO 2014/145018 A2 | 9/2014 |
| WO | WO 2016/072510 A1 | 5/2016 |
| WO | WO 2017/210492 A1 | 12/2017 |

OTHER PUBLICATIONS

International Search Report and Written Opinion for International Application No. PCT/US2018/35314 mailed Oct. 30, 2018.

* cited by examiner

PILOT OPERATED BLOW-OFF VALVES FOR HYDRAULIC ACTUATORS

CROSS REFERENCE OF RELATED APPLICATIONS

This application is a national stage filing under 35 U.S.C. § 371 of International Patent Application Serial No. PCT/US2018/035314, filed May 31, 2018, which claims the benefit of priority to U.S. Provisional Application Ser. No. 62/513,375, filed May 31, 2017, the disclosures of each of which are incorporated herein by reference in their entirety.

FIELD

Disclosed herein are hydraulic actuators for an active suspension system, valves for hydraulic actuators for an active suspension system, and methods for use thereof.

BACKGROUND

Over the last forty years, a number of automotive manufacturers have attempted to utilize hydraulic actuators in automobiles. However, hydraulic-based active suspension systems have yet to achieve widespread adoption and commercial success in the automotive field.

SUMMARY

During operation of a vehicle, the vehicle may be subject to a variety of external forces. These external forces may include, for example, forces originating from traversal of an uneven road surface (e.g., due to travelling over a bump or a pothole in the road), or due to vehicle dynamics caused by steering maneuvers (e.g. turning) or vehicle maneuvers (e.g., braking, accelerating). The vehicle may include a suspension system that is designed to at least partially isolate the vehicle body from the effects of one or more of these external forces. Particularly, a vehicle may include an active suspension system that incorporates one or more hydraulic actuators arranged to apply an active force between a wheel or wheel assembly of the vehicle and the body or chassis of the vehicle. This active force may, in some cases, at least partially mitigate the effect of one or more external forces acting on the vehicle. Hydraulic actuators may be associated with inertia—for example, a hydraulic actuator may utilize a rotating pump that is associated with rotational inertia. This inertia may lead to undesirable ride characteristics under certain driving conditions or vehicle maneuvers. Disclosed herein are hydraulic actuators, valves for hydraulic actuators, and methods for using such hydraulic actuators and/or valves, designed to at least partially overcome the consequences of inertia associated with the hydraulic actuator.

In one aspect, a hydraulic actuator is disclosed that includes a hydraulic cylinder having an internal volume, a piston slidably received in the hydraulic cylinder, thereby dividing the internal volume into a compression chamber and an extension chamber, a pump having a compression-side port and an extension-side port, a compression-side flow path that connects the compression-side port of the pump to the compression chamber, an extension side flow path that connects the extension-side port to the extension-side port of the pump to the extension chamber, a first bypass flow path that connects the compression chamber to the extension chamber, wherein the first bypass flow path does not include the pump, and a first check valve disposed along the first bypass flow path, wherein a cracking pressure of the first check valve dynamically varies based on an operating condition of the hydraulic actuator.

Additionally, the pump may be configured to vary a pressure differential between the compression-side port and the extension-side port, and the operating condition of the hydraulic actuator is the pressure differential generated by the pump at a given time. In some embodiments, the hydraulic actuator may further include a first pilot flow path that connects the compression-side port of the pump to the first volume of the first check valve.

Additionally or alternatively, the hydraulic actuator may include a second bypass flow path that connects the compression chamber to the extension chamber, wherein the second bypass flow path does not include the pump, and a second check valve disposed along the second bypass flow path, wherein a cracking pressure of the second check valve dynamically varies based on the operating condition of the hydraulic actuator (e.g., the pressure differential generated by the pump at a given time).

In some embodiments, the hydraulic actuator may further include a second pilot flow path that connects the extension-side port of the pump to a second volume of the second check valve. Additionally or alternatively, the hydraulic actuator may include an extension-side accumulator and a flow path that connects the extension side accumulator to the extension-side port of the pump. In some embodiments, the hydraulic actuator may include a first fluid restriction element disposed along the flow path that connects the extension-side accumulator to the extension-side port of the pump. Additionally or alternatively, the hydraulic actuator may include a compression-side accumulator and a flow path that connects the compression-side accumulator to the compression-side port of the pump. Additionally or alternatively, the hydraulic actuator may include a second fluid restriction element disposed along the flow path that connects the compression-side accumulator to the compression-side port of the pump.

In some embodiments, the hydraulic actuator may further include a flow path that connects the compression-side accumulator to the compression chamber and a fluid restriction element disposed along the flow path that connects the compression-side accumulator to the compression chamber. Additionally or alternatively, the hydraulic actuator may include a flow path that connects the extension-side accumulator to the extension chamber and a fluid restriction element disposed along the flow path that connects the extension-side accumulator to the extension chamber. In some embodiments, the hydraulic actuator may further include a third check valve disposed along the first bypass flow path, wherein the third check valve is hydraulically arranged in series with the first check valve. Additionally or alternatively, the hydraulic actuator may include a fourth check valve disposed along the second bypass flow path, wherein the fourth check valve is hydraulically arranged in series with the second check valve.

In some embodiments, the third check valve may have a static cracking pressure that does not depend on the operating conditions of the hydraulic actuator. In some embodiments, the fourth check valve may have a static cracking pressure that does not depend on the operating condition of the hydraulic actuator. In some embodiments, the hydraulic actuator may further include a third bypass flow path that connects the first bypass flow path to the second flow path and a third accumulator that branches off of the third bypass flow path.

In some embodiments, the hydraulic actuator may further include a third accumulator, a third bypass flow path that connect the first bypass flow path to the third accumulator, and a fourth bypass flow path that connects the second bypass flow path to the third accumulator, wherein the third bypass flow path does not include any check valve and wherein the fourth bypass flow path does not include any check valve. In some embodiments, the hydraulic actuator may include a piston rod that is attached to the piston and that extends out of the hydraulic cylinder.

In another aspect, a valve is disclosed that includes a shim stack having a first face and a second face, a spring element arranged to apply a first force on the first face of the shim stack, wherein the first force is in a first direction, a first fluid chamber having a first fluid pressure, wherein the first fluid pressure acts on the second face of the shim stack to apply a second force thereon, wherein the second force is in a second direction that is substantially opposite the first direction, a second fluid chamber having a second fluid pressure, wherein the second fluid pressure acts on the first face of the shim stack to apply a third force thereon, wherein the third force is in the first direction, and a pilot fluid chamber having a pilot fluid pressure, wherein the pilot fluid pressure acts on the first face of the shim stack to apply a fourth force thereon, wherein the fourth force is in the first direction.

Additionally, a hydraulic actuator is disclosed that includes the disclosed valve, and further includes a hydraulic pump arranged to vary the pilot fluid pressure. In some embodiments, the hydraulic pump may further include a first port, a second port, and a pilot flow path that connects the pilot fluid chamber to the first port of the hydraulic pump. Additionally, the hydraulic actuator may include a hydraulic cylinder having an extension chamber and a compression chamber separated by a moveable piston, wherein the first fluid chamber is connected to the compression chamber and the second fluid chamber is connected to the extension chamber.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
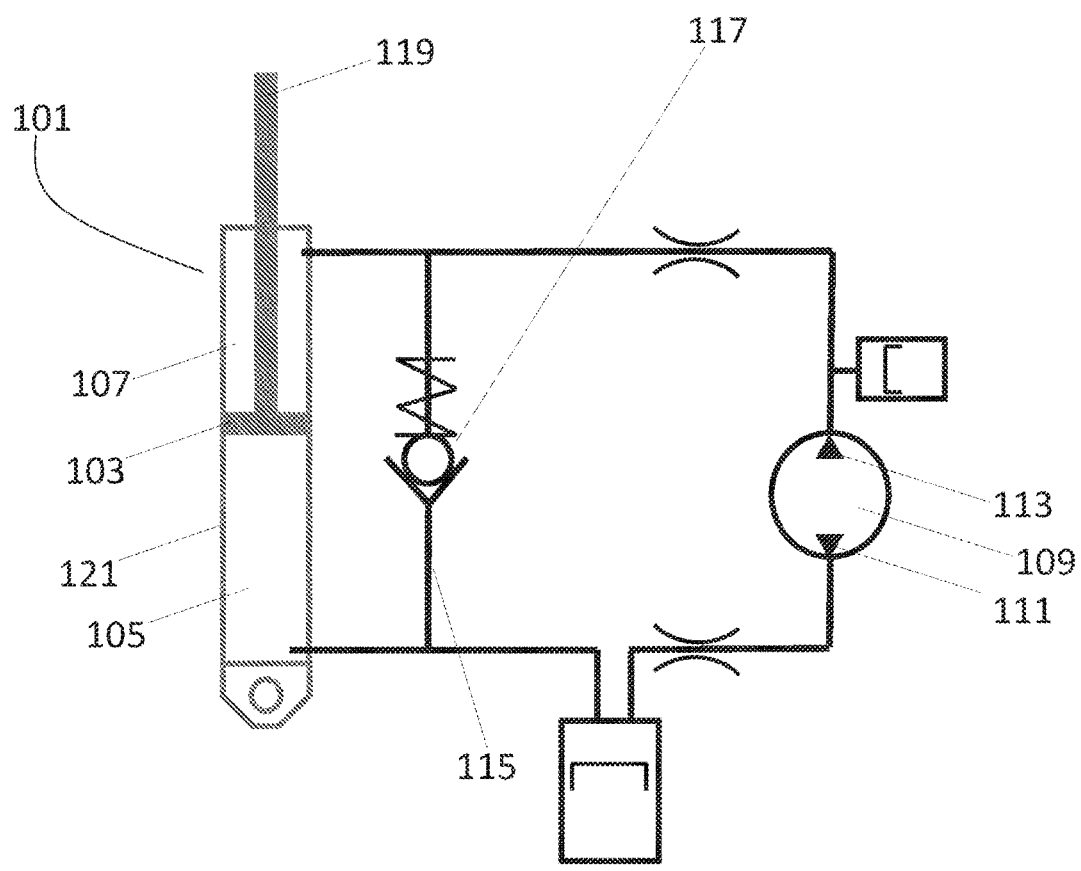
FIG. 1 illustrates an embodiment of a hydraulic actuator.

In a hydraulic-based active suspension system, one or more hydraulic actuators may be positioned between an unsprung mass (e.g., a wheel or wheel assembly) of a vehicle and a sprung mass (e.g., a vehicle body or chassis) of the vehicle. Each hydraulic actuator may include a hydraulic cylinder having a compression chamber and an extension chamber, and an associated hydraulic pump. The hydraulic pump may be operable to actively and controllably vary the fluidic pressure of the compression chamber and/or the extension chamber of the hydraulic cylinder, thereby applying a force onto a piston of the hydraulic cylinder that may cause the hydraulic cylinder to extend, compress, and/or resist motion arising from external inputs. As recognized by the inventors, when an external input is applied to the hydraulic cylinder, inertia of the rotating components of the hydraulic pump may be reflected onto motion of the actuator. As a result, the hydraulic actuator may appear overly "stiff" in response to certain external inputs, thereby leading to a degradation in ride quality for an occupant of the vehicle.

One potential solution is to utilize a 'bypass' flow path that allows fluid to flow between the compression chamber and the extension chamber of the hydraulic cylinder without passing through the pump (e.g., bypassing the pump). This allows for motion (e.g., compression or extension) of the hydraulic cylinder to occur, in response to external inputs, while bypassing inertia of the pump. Fluid flow through the bypass flow path may be controlled using one or more bypass valves. Ideally, the bypass valves would allow flow through the bypass flow path only in response to certain external inputs, and would substantially prevent flow through the bypass flow path when the pump is operating and active control is desired. While such behavior may be accomplished in theory using a semi-active or actuated valve (e.g., a solenoid valve) to control flow through the bypass flow path, such semi-active or actuated valves accordingly may increase cost and/or complexity, and/or may introduce bandwidth limitations into the overall system, and may require additional electronic controllers. Therefore, in certain applications, alternative valve configurations may be desirable.

In addition to, or instead of, controlling flow through the bypass flow path using a semi-active valve, one or more bypass check valves (sometimes referred to as blow-off valves) may be utilized. Check valves, as would be recognized of those of ordinary skill in the art, substantially prevent flow across the valve unless a pressure difference across the valve causes the valve to crack. As used herein, the term 'cracking pressure' is used to refer to a pressure differential between the compression chamber of a hydraulic cylinder and the extension chamber of a hydraulic cylinder at which a bypass check valve located hydraulically between the two chambers cracks. That is, when the pressure of the compression chamber differs from the pressure of the extension chamber by an amount exceeding the cracking pressure of a given bypass check valve, that check valve may "crack" in response, thereby allowing fluid to pass through the bypass check valve.

Typical check valves are designed to have a static cracking pressure. In order to permit the pump to have full authority to generate force in the hydraulic actuator, a bypass check valve should be utilized having a cracking pressure that is no less than a maximum pressure differential that the pump is configured to generate. However, in such cases, the bypass check valve would act only in response to large external inputs that result in pressure differentials equaling or exceeding the maximum pressure differential that the pump is configured to generate. For smaller external inputs, the bypass check valve may remain substantially closed, thereby not allowing for mitigation of the pump's inertia.

The inventors have recognized that performance of a hydraulic-based active suspension may be improved by controlling flow through the bypass flow path by using a bypass check valve having a dynamic cracking pressure. The bypass check valve may be designed to have a cracking pressure that dynamically varies in proportion to the pressure differential generated by the pump at a given time. Therefore, when the pump is operating to produce a large pressure differential, the bypass check valve may have a cracking pressure that is higher than when the pump is operating to produce a smaller, or no, pressure differential. In this way, the pump can generate high pressure differentials without cracking the bypass check valve. Likewise, an external input may trigger cracking of the bypass check valve even if it results in pressure differentials less than the pressure differential that the pump is configured to generate.

In an exemplary embodiment, a shim stack may be utilized as a check valve. As described herein, a pilot operated pressure chamber may be used to dynamically vary the cracking pressure of the stack. The pilot pressure can be controlled directly by the pressure differential generated by the pump. External inputs having sufficiently large magnitudes and/or frequencies may result in cracking of the bypass check valve, resulting in flow through the bypass flow path, thereby mitigating inertia effects of the pump. In the absence of sufficiently large or high frequency external inputs, cracking of the bypass check valve by active operation of the pump may be precluded, therefore maximizing the force authority allowed for by the hydraulic pump.

Turning now to the figures, several non-limiting embodiments are described in detail. FIG. 1 illustrates an exemplary hydraulic actuator that may be used in an active suspension system of a vehicle. In certain embodiments, the hydraulic actuator may include a hydraulic cylinder 101. The hydraulic cylinder 101 may be at least partially filled with a fluid and may include a housing 121; a piston 103 slidably received in the housing 121, thereby separating an internal volume of the hydraulic cylinder 101 into a compression chamber 105 and an extension chamber 107; and a piston rod 119 attached to the piston. The hydraulic actuator may further include a hydraulic pump 109 having a compression-side port 111 and an extension-side port 113; a compression-side flow path fluidly connecting the compression-side port 113 of the pump to the compression volume 105; and an extension-side flow path fluidly connecting the extension-side port 103 of the pump to the extension volume 107. The piston 103 may slide within the hydraulic cylinder 101, resulting in extension of the hydraulic cylinder (referring to movement that causes the piston rod 119 to further protrude from the housing 121) or compression of the hydraulic cylinder (referring to movement that causes the piston rod 119 to be further inserted into the housing 121). In various embodiments, the compression-side flow path and/or extension-side flow path may include one or more valves, restrictions, or other hydraulic elements as known in the art, for controlling fluid flow.

The exemplary actuator of FIG. 1 further includes a first bypass flow path 115. The first bypass flow path 115 allow for fluid exchange to occur between the compression chamber 105 and the extension chamber 107, without requiring fluid to pass through the pump. In certain embodiments, one or more bypass flow paths may pass through the piston, or otherwise be contained within the hydraulic cylinder. In the illustrated embodiment, the first bypass flow path 115 includes a first check valve 117. The first check valve is exposed to fluid pressure of the compression chamber 105 on one side and to fluid pressure in the extension chamber 107 on the other side. If the fluid pressure of the compression chamber 105 exceeds the fluid pressure of the extension chamber 107 by an amount exceeding a cracking pressure of the first check valve 117, the first check valve 117 may "crack" (e.g., at least partially open), thereby allowing fluid to flow across the valve.

In the embodiment of FIG. 1, the cracking pressure of the first check valve 117 may be considered static—that is, the pressure differential required between the compression chamber and the extension chamber to crack the first check valve does not depend on operating conditions such as, for example, flow rates or pump speed. The cracking pressure is generally selected based on design considerations (e.g., so that the check valve cracks at pressure differentials slightly above the maximum expected pressure differential that will be generated by the pump during use). The first check valve may include a spring or other resilient element. In certain embodiments, the spring or other resilient element may be used to pre-load a shim stack, as is known in the art. The cracking pressure of the check valve may be varied by adjusting the properties of the spring or other resilient element and/or the shims of the shim stack.

As described above, in certain applications it may be beneficial to modify the hydraulic actuator of FIG. 1 so that the cracking pressure of the first check valve 117 dynamically varies based on operating conditions of the hydraulic actuator. Particularly, it may be desirable for the first check valve 117 to operate with a cracking pressure that approximately tracks the pressure differential generated by the hydraulic pump 109 at a given time. Such configuration would allow for the pump to generate a large pressure differential without causing cracking of the first check valve, while still allowing the first check valve to react to (e.g., to crack in response to) external inputs of appropriate magnitudes or frequencies.

Figure 2:
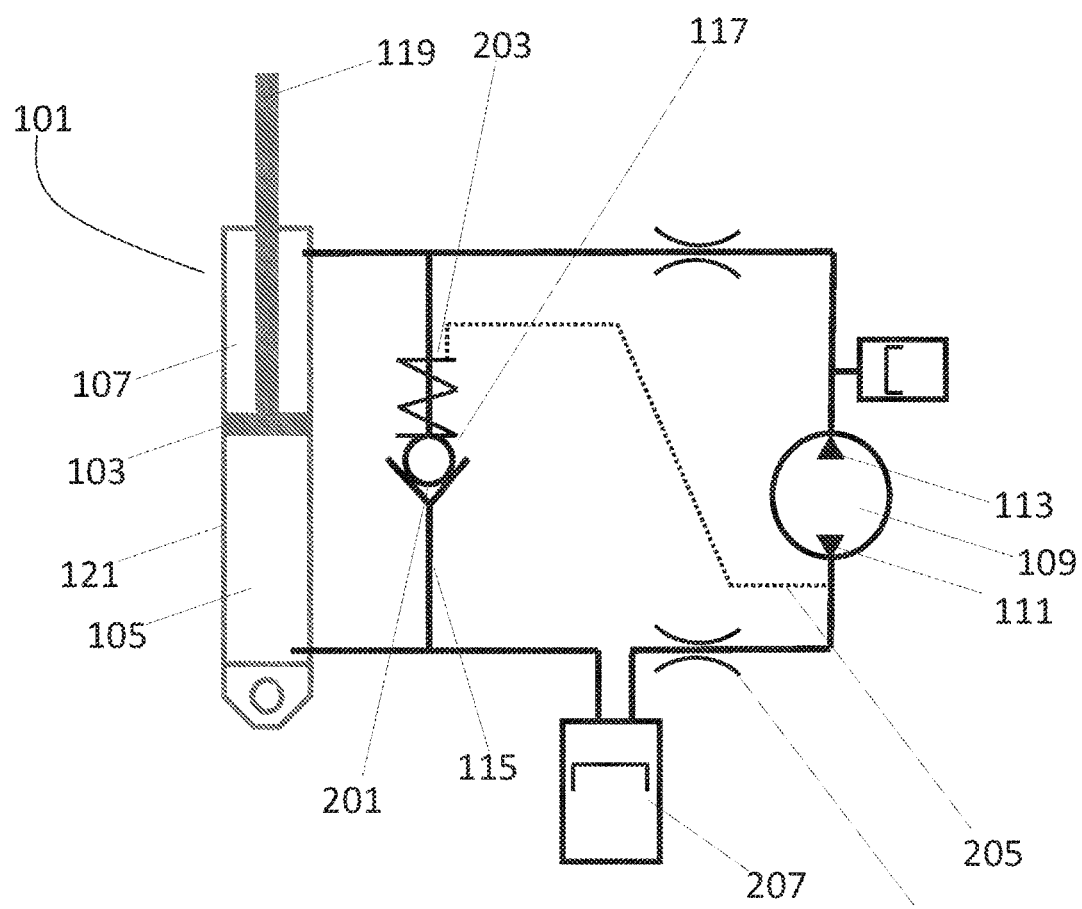
FIG. 2 illustrates an embodiment of a hydraulic actuator including a check valve with a dynamically varying cracking pressure.

FIG. 2 illustrates an embodiment of a hydraulic actuator, wherein the first check valve 117 has a cracking pressure that dynamically varies based on a pressure differential generated by the hydraulic pump 109. Similar to FIG. 1, the first check valve 117 of FIG. 2 is located along a first bypass flow path 115 that fluidly connects the compression chamber 105 of the hydraulic cylinder 101 to the extension chamber 107 of the hydraulic cylinder 101. As with FIG. 1, a first side 201 of the first check valve 117 is exposed to fluid pressure of the compression chamber 105, and a second side 203 of the first check valve 117 is exposed to fluid pressure of the extension chamber 107. Notably, a first pilot flow path 205 has been introduced that fluidly connects the compression-side port 111 of the hydraulic pump 109 to the second side 203 of the first check valve 117. The illustrated embodiment further includes a restriction, such as, for example, an orifice, located between the compression-side port of the hydraulic pump 109 and the compression chamber 105 of the hydraulic actuator.

Optionally, the compression side flow path may further include one or more accumulators 207.

Continuing with FIG. 2, when the hydraulic pump 109 is not operating (that is, the pump is not generating a pressure differential), the cracking pressure of the first check valve 117 is determined solely by the spring constant of the spring or resilient element, and may referred to as the 'resting cracking pressure'. On the other hand, when the hydraulic pump 109 is operated to generate a pressure differential, the fluid pressure discharged at the compression-side port of the hydraulic pump 109 will be communicated to the second side 203 of the first check valve 117 via the pilot flow path 205. As a result, the first check valve will crack only if the fluid pressure in the compression chamber 105 is sufficiently greater than both the fluid pressure in the extension chamber 107 and the fluid pressure at the compression-side port 111 of the hydraulic pump 109. The cracking pressure of the first check valve, therefore, varies based on the fluid pressure discharged at the compression-side port of the hydraulic pump which, in turn, depends on the pressure differential generated by the hydraulic pump 109.

As an exemplary case, the hydraulic actuator of FIG. 2 may be designed to have a static pressure of 1,000 psi, indicating that when the hydraulic pump 109 is not operating and when there is no external input, the fluid pressure of all chambers (including the compression chamber and the extension chamber) and all flow paths is 1,000 psi. An external input into the system (e.g., a force applied to the piston rod 119) that causes the hydraulic cylinder to compress will result in an increase in fluid pressure in the compression chamber 105 and a decrease in fluid pressure in the extension chamber 107, leading to a first pressure differential between the compression chamber 105 and the extension chamber 107. When the hydraulic pump is not operating, the first check valve 117 may crack if this first pressure differential exceeds the resting cracking pressure of the first check valve 117. For an exemplary resting cracking pressure of 200 psi, the first check valve may crack if, when the pump is not operating, fluid pressure of the compression chamber 105 exceeds 1,100 psi while the fluid pressure of the extension chamber 107 falls below 900 psi.

We now consider the same exemplary hydraulic actuator (having a static pressure of 1,000 psi) when the hydraulic pump 109 is being operated to generate a pressure differential. For example, the hydraulic pump 109 may be driven (e.g., via application of a torque by an electric motor, not pictured) to generate a pressure differential of 400 psi between the compression-side port 111 of the hydraulic pump and the extension-side port 113 of the hydraulic pump, leading to exemplary pressures of 1,200 psi at the compression-side port and 800 psi at the extension-side port. Given sufficient time to reach steady state conditions, the fluid pressure of the compression chamber 105 will be approximately equal to the fluid pressure at the compression-side port 111, and the fluid pressure of the extension chamber 107 will be approximately equal to fluid pressure at the extension-side port 113. Utilizing the above exemplary values, the pressure differential between the compression chamber and the extension chamber will therefore be approximately 400 psi, which exceeds the resting cracking pressure of 200 psi. However, in FIG. 2, as the pilot flow path 205 exposes the second side 203 of the first check valve 117 to the fluid pressure at the compression-side port 111 of the hydraulic pump 119, the first check valve 117 does not crack in response to the pressure differential generated by the pump unless an external input is simultaneously applied to the piston rod that causes the pressure differential between the compression chamber and extension chamber to exceed the pressure differential generated by the pump.

The cracking pressure of the first check valve therefore varies based on the pressure differential generated by the pump—when the pump is not operating (i.e., it is generating zero pressure differential), the cracking pressure is the resting cracking pressure, as determined by the design of the valve and the spring constant of the spring or resilient element; whereas when the hydraulic pump 109 is operating at a given time to generate a pressure differential, the cracking pressure at that given time is no less than the generated pressure differential. In this way, the pump has full authority to generate forces on the piston without causing cracking of the first check valve.

Further, the restriction 209 may be sized so that any external input having frequencies above a threshold frequency may result in cracking of the first check valve 117 and therefore in flow through the first check valve 117. As would be recognized by one of ordinary skill, an external input (e.g., an external force applied to the piston rod 119) that causes the hydraulic cylinder 101 to compress may result in flow of fluid from the compression chamber 105 to the compression-side port 111 of the hydraulic pump 109. Due to the restriction 209, a pressure drop will arise across the restriction 209 that is directly related to the velocity of the flow that results from the external input. For relatively high flow velocities, resulting for example from high frequency external inputs, the pressure drop across the restriction 209 may be large enough to result in cracking of the first check valve 117, leading to increased flow through the first check valve and reduced flow through the hydraulic pump. The inertia effects of the pump 119 in response to high frequency external inputs may therefore be mitigated. For low frequency external inputs, the pressure at the compression-side port of the pump, and therefore within the pilot flow path 205, may equalize to the pressure of the compression chamber 105. Cracking of the first check valve in response to external inputs of a sufficiently low frequency may therefore be limited.

The hydraulic pump 119, therefore, may be envisioned as serving two purposes. First, it is able to generate high pressures and high forces at low frequencies (e.g., at frequencies below a cutoff frequency of the hydraulic restriction). Second, it is able to control the cracking pressure of the check valves by varying the pilot pressures at frequencies above the cutoff frequency of the hydraulic restriction. The result is a system capable of both generating high forces at low frequencies, while being transparent to, and acting functionally similar to a semi-active valve, in response to high frequency external inputs.

Figure 3:
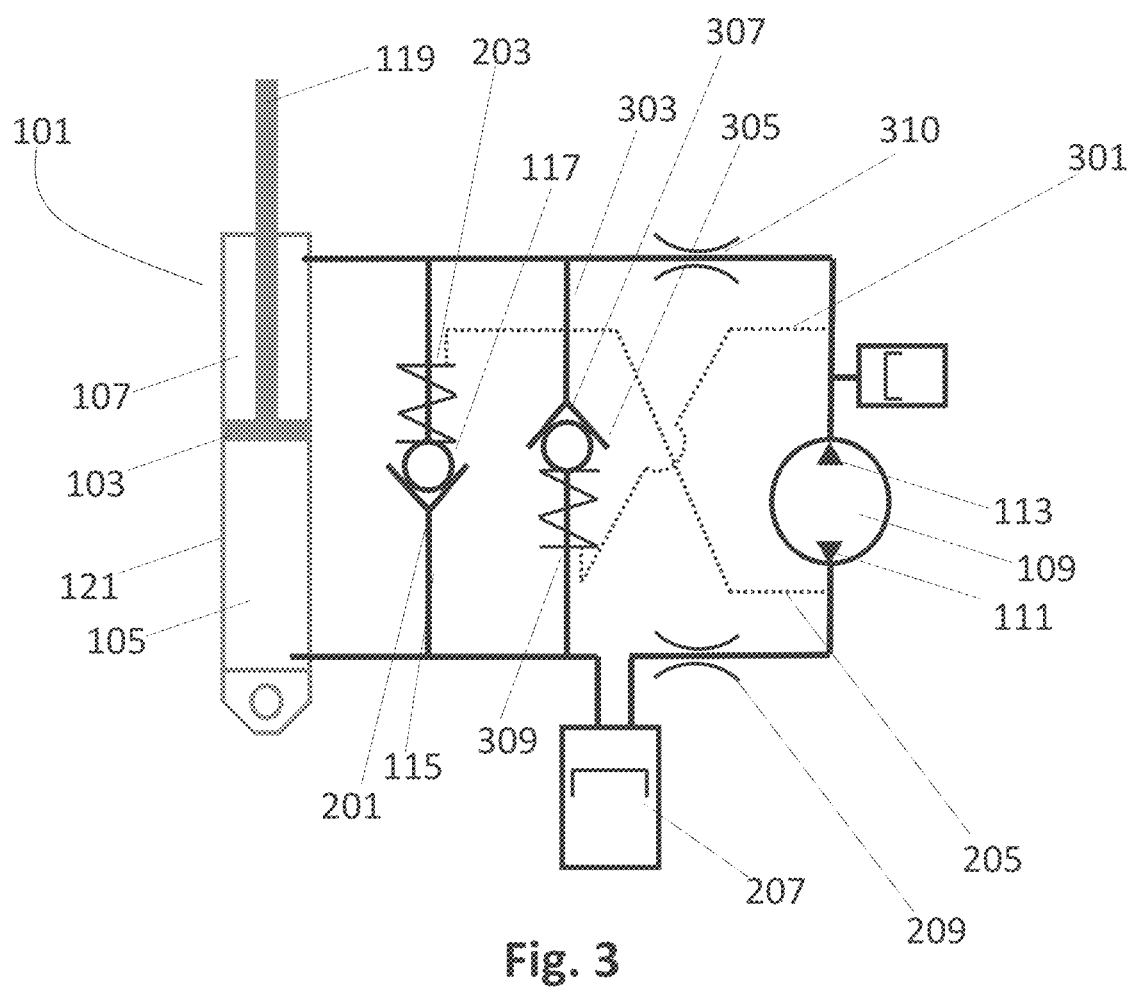
FIG. 3 illustrates an embodiment of a hydraulic actuator including a plurality of check valves with dynamically varying cracking pressures.

FIG. 3 illustrates an alternative embodiment of a hydraulic actuator. The hydraulic actuator of FIG. 3 is similar to that of FIG. 2, with the addition of a second bypass flow path 303 that includes a second check valve 305. The second check valve 305 has a first side 307 exposed to fluid pressure of the extension chamber 107 and a second side 309 exposed to fluid pressure of the compression chamber 105. A second pilot flow path 301 is included that fluidly connects the extension-side port 113 of the hydraulic pump 109 to the second side 309 of the second check valve 305. In the illustrated embodiment, a second restriction 310 is positioned fluidly between the extension-side port 113 and the second bypass flow path 303. As illustrated, the second check valve 305 is oriented opposite to the first check valve. The second bypass flow path 303, second pilot flow path 301, and second check valve 305 may be designed to control fluid flow in response to external inputs that result in extension of the hydraulic cylinder 101, in a manner that is substantially analogous to that described above for the first bypass flow path 115, first check valve 117, and first pilot flow path 205.

Figure 4:
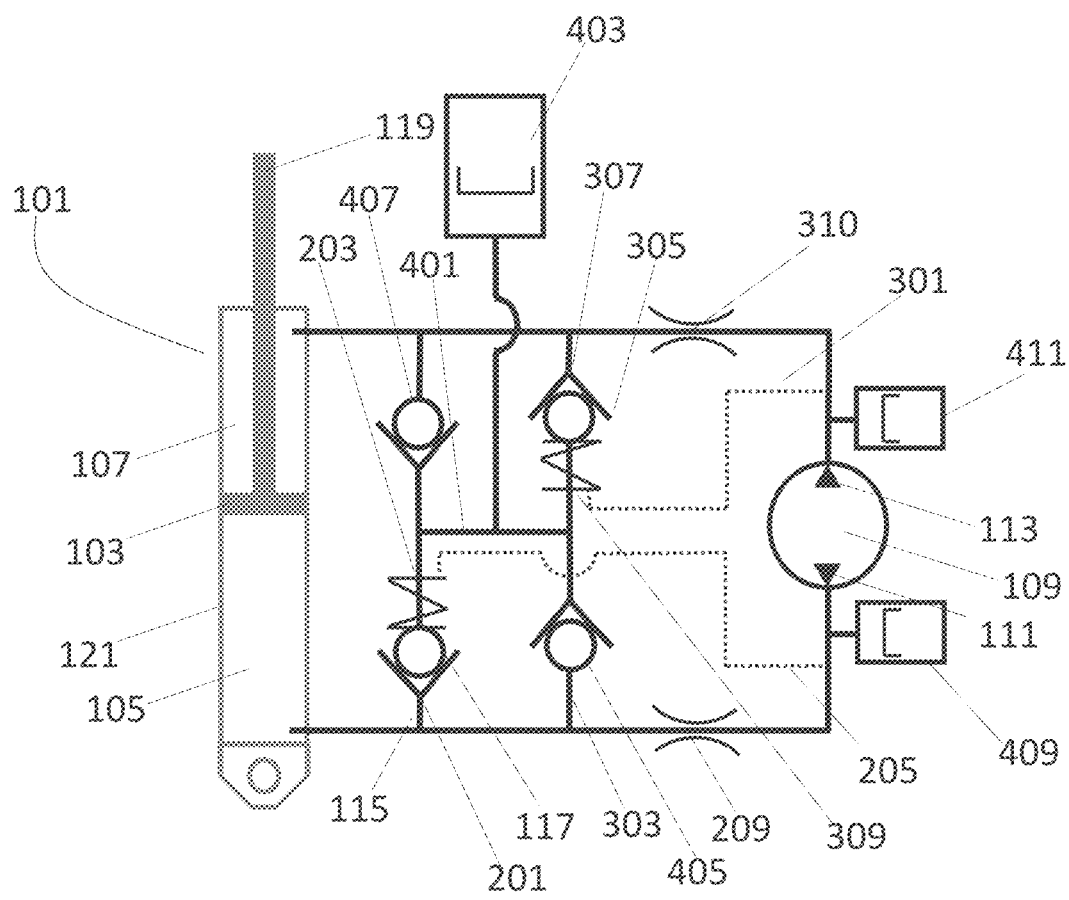
FIG. 4 illustrates an alternative embodiment of a hydraulic actuator including a plurality of check valves with dynamically varying cracking pressures.

FIG. 4 illustrates yet another embodiment of a hydraulic actuator having two pilot-controlled blow-off valves. In this embodiment, the first bypass flow path 115 and the second bypass flow path 303 are fluidly connected via an intervening flow path 401. An accumulator, referred to as the main gas accumulator 403, is in fluid communication with the intervening flow path. Additionally, in the illustrated embodiment a third check valve 407 is fluidly disposed between the extension chamber 107 and the intervening flow path 401. A first side of the third check valve 407 is exposed to fluidic pressure of the extension chamber 107, and a second side to fluid pressure of the intervening flow path 401 on a second side of the valve. Likewise, in the illustrated embodiment a fourth check valve 405 is fluidly disposed between the compression chamber 105 and the intervening flow path 401. A first side of the fourth check valve 405 is exposed to fluidic pressure of the compression chamber 105, and a second side of the fourth check valve 405 is exposed to fluidic pressure of the intervening flow path 401.

Figure 5:
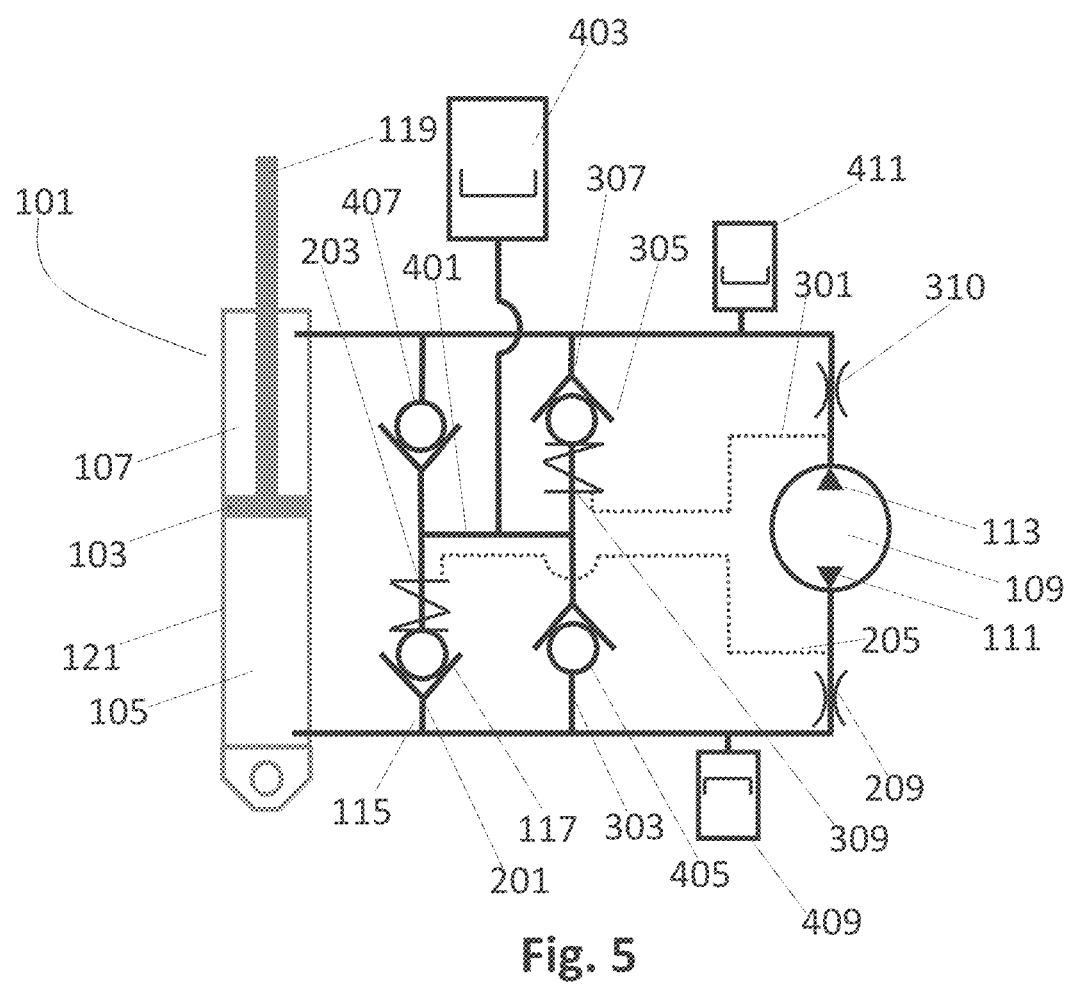
FIG. 5 illustrates an alternative embodiment of a hydraulic actuator including a plurality of check valves with dynamically varying cracking pressures.

In the illustrated embodiment, the main gas accumulator 403 may be, under certain conditions, considered hydraulically isolated from the hydraulic cylinder via check valves. This may allow flexibility in various design considerations, for example in selection of static or pre-charge pressures. Further, since the main gas accumulator 403 may be, under certain conditions, isolated from the hydraulic cylinder, it may be advantageous to additionally include a compression-side gas accumulator 409 and/or an extension-side gas accumulator 411 for the purposes of noise mitigation and/or for smoothing out ripple generated by operation of the hydraulic pump 109. As illustrated, the compression-side accumulator 409 is positioned hydraulically between the compression-side port 111 of the hydraulic pump 109 and the first restriction 209. Likewise, the extension-side accumulator 411 is positioned hydraulically between the extension-side port 113 of the hydraulic pump 109 and the second restriction 310. By positioning the compression- side accumulator and/or extension-side accumulator in this manner, the hydraulic cylinder may, in certain operating conditions, function as a high-bandwidth semi- active system. Further, such positioning of the compression-side accumulator and/or extension-side accumulator may isolate the pilot pressure that the first check valve 117 and/or second check valve 305 are exposed to from any ripple generated by the pump. Alternatively, as illustrated in FIG. 5, the compression-side accumulator 409 may be positioned hydraulically between the first restriction 209 and the compression-side chamber 105 and/or the extension-side accumulator 411 may be positioned hydraulically between the second restriction 310 and the extension-side chamber 107. Advantageously, the embodiment of FIG. 5 may allow for increased speeds at which the hydraulic pump 109 controls the pressure in the first pilot flow path 205 and/or second pilot flow path 301. However, the pilot flow paths may be exposed to pressure ripple generated by the hydraulic pump 109.

Figure 6:
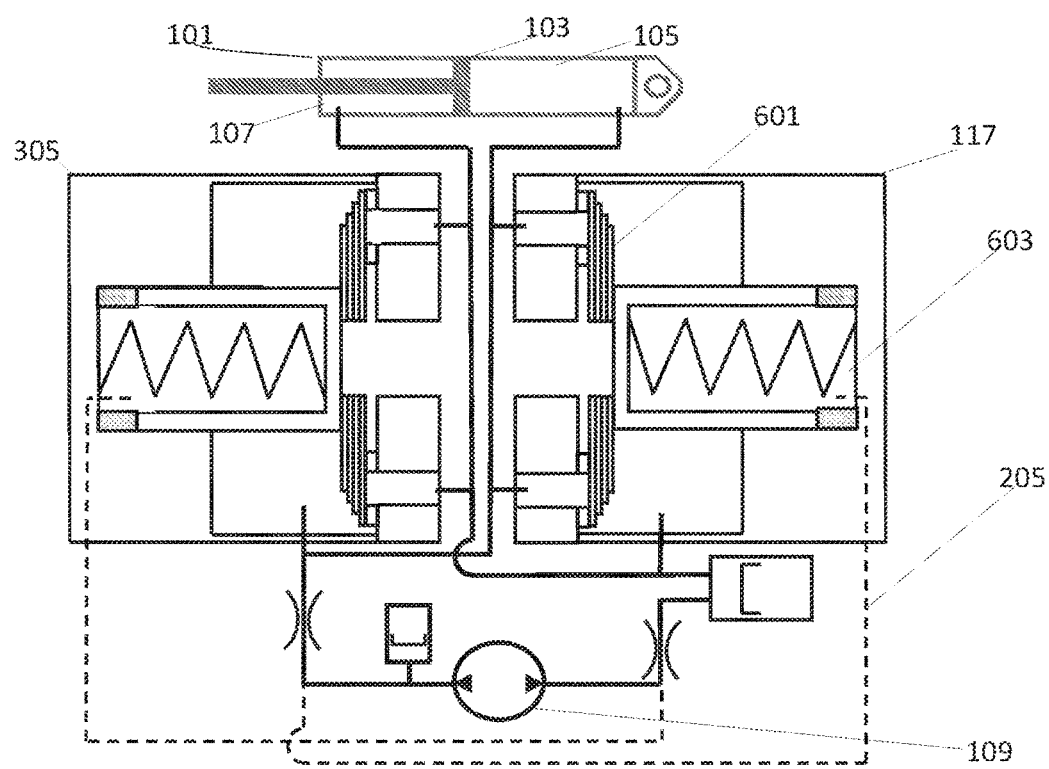
FIG. 6 illustrates a magnified view of an exemplary dynamically controlled check valve in a hydraulic actuator.

FIG. 6 illustrates a hydraulic actuator that is equivalent to that of FIG. 3, with a magnified view of the first check valve 117 and second check valve 305. It is understood that FIG. 6 may be modified (e.g., the various accumulators and/or restrictions may be rearranged) according to any of the embodiments described above.

As illustrated in FIG. 6, the first check valve 117 includes a shim stack 601. A first force acts on a first face of the shim stack 601, while a second force operates on a second face of the shim stack 601. The first force arises due to the fluid pressure of the compression chamber 105 acting on the first face of the shim stack 601, and is equal to the fluid pressure of the compression chamber 105 times the area of the first face of the shim stack 601 that is exposed to said pressure. It is known in the art, the said shim stack 601 may comprise of at least one disk, and the size and the number of disks used may be varied to achieve different flow characteristics of the shim stack. The second force has at least three components: the first arises due to the restoring force provided by a preloaded spring element 603; the second arises due to fluid pressure of the first pilot flow path 205 acting on a first exposed area of the second face of the shim stack 601; and the third arises due to fluid pressure of the extension chamber 107 acting on a second exposed area of the second face of the shim stack 601. The first check valve 117 may crack when the first force acting on the first face of the shim stack exceeds the second force acting on the second face of the shim stack, causing the shim stack to move or flex such that fluid may flow across the valve. As the second force depends, at least in part, on the pressure of the first pilot flow path 205 which, in turn, depends on the pressure differential generated by the hydraulic pump 109, the result is that the first check valve 117 has a dynamic cracking pressure that varies based on operating conditions of the hydraulic actuator (e.g., based on the pressure differential generated by the hydraulic pump 109). The spring element 603 therefore applies the required preload to the first shim stack 601 to give a desired 'base' damping curve absent operation of the pump 109. In certain embodiments, the first check valve 117 may be constructed so that the preload provided by the spring element 603 may be manually adjusted. The second check valve 305 may be constructed analogously to the first check valve 117.

In certain embodiments, a vehicle may include a suspension system that includes one or more of the hydraulic actuators as described herein. In certain embodiments, the suspension system may include a plurality of the hydraulic actuators as described herein. In certain embodiments, each wheel of the vehicle may be associated with a given hydraulic actuator. In these embodiments, the hydraulic cylinder of the hydraulic actuator may be interposed between each wheel assembly of the vehicle and a body or chassis of the vehicle.

As the term is used herein, a flow path is said to connect a first component to a second component when, under at least certain operating conditions (e.g., certain pressures or certain configurations of valves), fluid may flow from a volume of the first component, through the flow path, to a volume of the second component. If a flow path comprises a switchable valve or other flow control device between the first component and second component, the flow path is understood to connect the first component to the second component whether the valve is open or closed since, under at least certain operating conditions (e.g., opening of the valve, increase in fluid pressure above a pressure relief valve's set point, etc.), fluid may flow from a chamber of the first component, through the flow path comprising the valve, to the chamber of the second component. A flow path may comprise various pipes, tubes, nipples, bores, valves, open volumes, chambers, or other channels as known in the art.

We claim:
1. A hydraulic actuator comprising:
a hydraulic cylinder having an internal volume;
a piston slidably received in the hydraulic cylinder, thereby dividing the internal volume into a compression chamber and an extension chamber;
a pump having a compression-side port and an extension-side port;
a compression-side flow path that hydraulically connects the compression-side port of the pump to the compression chamber, wherein the compression-side flow path includes a first restriction;
an extension-side flow path that hydraulically connects the extension-side port of the pump to the extension chamber;

a first bypass flow path that connects the compression chamber to the extension chamber, wherein the first bypass flow path does not include the pump;
a first check valve disposed along the first bypass flow path arranged to block flow from the extension chamber to the compression chamber but allow flow in an opposite direction when its cracking pressure is exceeded; and
a compression-side pilot flow path in fluid communication with the compression-side port and a downstream side of the first check valve;
wherein the first restriction and the compression-side pilot flow path are sized and arranged such that the cracking pressure of the first check valve, in response to a pressure differential produced by the pump at a first frequency above a threshold frequency, is greater than the cracking pressure of the first check valve in response to a pressure differential between the compression chamber and the extension chamber, at the first frequency, produced by an external input in at least one operating condition of the hydraulic actuator.

2. The hydraulic actuator of claim 1, further comprising:
a second bypass flow path that hydraulically connects the compression chamber to the extension chamber, wherein the second bypass flow path does not include the pump;
a second check valve disposed along the second bypass flow path, wherein a cracking pressure of the second check valve dynamically varies based on the at least one operating condition of the hydraulic actuator.

3. The hydraulic actuator of claim 2, wherein the at least one operating condition of the hydraulic actuator is the pressure differential generated by the pump.

4. The hydraulic actuator of claim 3, further comprising an extension-side pilot flow path in fluid communication with the extension-side port and a downstream side of the second check valve.

5. The hydraulic actuator of claim 2, further comprising a third check valve disposed along the first bypass flow path, wherein the third check valve is hydraulically arranged in series with the first check valve.

6. The hydraulic actuator of claim 5, further comprising a fourth check valve disposed along the second bypass flow path, wherein the fourth check valve is hydraulically arranged in series with the second check valve.

7. The hydraulic actuator of claim 6, wherein the fourth check valve has a static cracking pressure that does not depend on the at least one operating condition of the hydraulic actuator.

8. The hydraulic actuator of claim 5, wherein the third check valve has a static cracking pressure that does not depend on the at least one operating condition of the hydraulic actuator.

9. The hydraulic actuator of claim 5, further comprising:
a third bypass flow path that connects the first bypass flow path to the second flow path;
a third accumulator that branches off of the third bypass flow path.

10. The hydraulic actuator of claim 5, further comprising:
a third accumulator,
a third bypass flow path that connects the first bypass flow path to the third accumulator;
a fourth bypass flow path that connects the second bypass flow path to the third accumulator;
wherein the third bypass flow path does not include any check valve and wherein the fourth bypass flow path does not include any check valve.

11. The hydraulic actuator of claim 1, further comprising:
an extension-side accumulator;
a first flow path that connects the extension-side accumulator to the extension-side port of the pump and a second flow path that connects the extension-side accumulator to the extension chamber, wherein the extension-side flow path includes at least a portion of the first flow path and at least a portion of the second flow path.

12. The hydraulic actuator of claim 11, further comprising a second fluid restriction disposed along the first flow path that connects the extension-side accumulator to the extension-side port of the pump.

13. The hydraulic actuator of claim 1, further comprising:
a compression-side accumulator;
a third flow path that connects the compression-side accumulator to the compression-side port of the pump; and
a fourth flow path that connects the compression-side accumulator to the extension chamber, wherein the compression-side flow path includes at least a portion of the third flow path and at least a portion of the fourth flow path.

14. The hydraulic actuator of claim 13, wherein the first fluid restriction is disposed in the third flow path.

15. The hydraulic actuator of claim 13, wherein the first fluid restriction element is disposed along the fourth flow path.

16. The hydraulic actuator of claim 1, further comprising a piston rod that is attached to the piston and that extends out of the hydraulic cylinder.

17. A hydraulic actuator comprising:
a hydraulic cylinder having an internal volume;
a piston slidably received in the hydraulic cylinder, thereby dividing the internal volume into a compression chamber and an extension chamber;
a pump having a compression-side port and an extension-side port;
a compression-side flow path that hydraulically connects the compression-side port of the pump to the compression chamber;
an extension-side flow path that connects the extension-side port of the pump to the extension chamber;
a first bypass flow path that hydraulically connects the compression chamber to the extension chamber, wherein the first bypass flow path does not include the pump; and
a first check valve disposed along the first bypass flow path arranged to block flow from the compression chamber to the extension chamber but allow flow in an opposite direction when its cracking pressure is exceeded;
wherein the cracking pressure of the first check valve, in response to a pressure differential produced by the pump at a first frequency above a threshold frequency, is greater than the cracking pressure of the first check valve in response to a pressure differential between the compression chamber and the extension chamber, at the first frequency, produced by an external input in at least one operating condition of the hydraulic actuator.

18. A hydraulic actuator comprising:
a hydraulic cylinder having an internal volume;
a piston slidably received in the hydraulic cylinder, thereby dividing the internal volume into a compression chamber and an extension chamber;
a pump having a compression-side port and an extension-side port;

a compression-side flow path that hydraulically connects the compression-side port of the pump to the compression chamber;

an extension-side flow path that hydraulically connects the extension-side port of the pump to the extension chamber;

a first bypass flow path that connects the compression chamber to the extension chamber, wherein the first bypass flow path does not include the pump; and a first check valve disposed along the first bypass flow path arranged to block flow from the extension chamber to the compression chamber but allow flow in an opposite direction when its cracking pressure is exceeded;

wherein the cracking pressure of the first check valve, in response to a pressure differential produced by the pump at a first frequency above a threshold frequency, is greater than the cracking pressure of the first check valve in response to a pressure differential between the compression chamber and the extension chamber, at the first frequency, produced by an external input in at least one operating condition of the hydraulic actuator.

\* \* \* \* \*